United States Patent
Wang et al.

(10) Patent No.: US 9,966,827 B2
(45) Date of Patent: May 8, 2018

(54) FLAT LINEAR VIBRATION MOTOR WITH TWO VIBRATORS AND TWO RESONANT FREQUENCIES

(71) Applicants: Hongxing Wang, Shenzhen (CN); Lubin Mao, Shenzhen (CN); Fei Hou, Shenzhen (CN)

(72) Inventors: Hongxing Wang, Shenzhen (CN); Lubin Mao, Shenzhen (CN); Fei Hou, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 202 days.

(21) Appl. No.: 15/062,125

(22) Filed: Mar. 6, 2016

(65) Prior Publication Data
US 2017/0033654 A1    Feb. 2, 2017

(30) Foreign Application Priority Data

Jul. 31, 2015    (CN) .................... 2015 2 0571808 U

(51) Int. Cl.
| | | |
|---|---|---|
| H02K 33/00 | (2006.01) | |
| H02K 33/16 | (2006.01) | |
| H02K 33/02 | (2006.01) | |
| H02K 7/18 | (2006.01) | |

(52) U.S. Cl.
CPC .......... *H02K 33/16* (2013.01); *H02K 7/1869* (2013.01); *H02K 7/1876* (2013.01); *H02K 7/1892* (2013.01); *H02K 33/00* (2013.01); *H02K 33/02* (2013.01)

(58) Field of Classification Search
CPC .. H02K 7/1869; H02K 7/1876; H02K 7/1892; H02K 33/00–33/18; H02K 1/34; H02K 7/061; H02K 7/065
USPC ........ 310/25, 15, 12.01, 81, 80, 321, 20, 21, 310/28–30, 36–37
See application file for complete search history.

(56) References Cited

U.S. PATENT DOCUMENTS

| | | | | |
|---|---|---|---|---|
| 3,501,745 | A * | 3/1970 | Beckman ............... | H01H 51/32 200/52 R |
| 4,555,682 | A * | 11/1985 | Gounji ................... | H03H 9/562 310/321 |
| 5,543,956 | A * | 8/1996 | Nakagawa .......... | G02B 26/085 310/36 |
| 7,193,346 | B2 * | 3/2007 | Kim ....................... | H02K 7/061 310/81 |
| 8,461,969 | B2 * | 6/2013 | An ......................... | H02K 33/06 310/320 |

(Continued)

*Primary Examiner* — Bernard Rojas
*Assistant Examiner* — Maged Almawri
(74) *Attorney, Agent, or Firm* — Na Xu; IPro, PLLC

(57) ABSTRACT

A vibration motor includes a housing; a vibration unit accommodated and suspended in the housing, the vibration unit including a first vibrator having a first resonant frequency, and a second vibrator having a second resonant frequency; a first elastic member having one end fixed to the first vibrator and another end fixed to the housing for suspending the first vibrator in the housing; and a second elastic member having one end fixed to the second vibrator and another end fixed to the housing for suspending the second vibrator in the housing. By virtue of the configuration, the vibration motor is capable of working at two different resonant frequencies.

6 Claims, 6 Drawing Sheets

(56) References Cited

U.S. PATENT DOCUMENTS

| | | | | |
|---|---|---|---|---|
| 2006/0066164 A1* | 3/2006 | Kim | ................... | H02K 7/061 |
| | | | | 310/81 |
| 2010/0302752 A1* | 12/2010 | An | ................... | H02K 33/06 |
| | | | | 361/807 |
| 2011/0266892 A1* | 11/2011 | Wauke | ................ | B06B 1/045 |
| | | | | 310/25 |
| 2012/0170792 A1* | 7/2012 | Li | ................... | H02K 33/16 |
| | | | | 381/412 |
| 2013/0169072 A1* | 7/2013 | Oh | ................... | B06B 1/045 |
| | | | | 310/36 |
| 2015/0123498 A1* | 5/2015 | Yang | ................. | H02K 33/16 |
| | | | | 310/25 |

* cited by examiner

FLAT LINEAR VIBRATION MOTOR WITH TWO VIBRATORS AND TWO RESONANT FREQUENCIES

FIELD OF THE DISCLOSURE

The present disclosure generally relates to vibration motors, and more particularly to a vibration motor used in a portable consumer electronic device.

BACKGROUND

With the development of the electronic technologies, portable consumer electronic devices are more popular and desired by people. A portable consumer electronic device, such as a wireless communication device, generally includes a vibration motor sued for generating tactile feedback.

Typically, flat linear vibration motors are commonly used. A flat linear vibration motor includes an elastic member, a vibration unit suspended by the elastic member, and a housing for accommodating the elastic member and the vibration unit therein. The elastic member is generally welded to the vibration unit. Such a vibration motor only has one resonant frequency, at which the vibration motor has maximum vibration amplitude. For some certain applications, the vibration motor needs two resonant frequencies for performing desired requirements. Such a typical vibration motor cannot satisfy the requirements.

For this reason, it is necessary to provide a novel vibration motor to overcome the shortcomings above.

BRIEF DESCRIPTION OF THE DRAWINGS

Many aspects of the embodiments can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be described in detail below with reference to the attached drawings and exemplary embodiments thereof.

Figure 1:
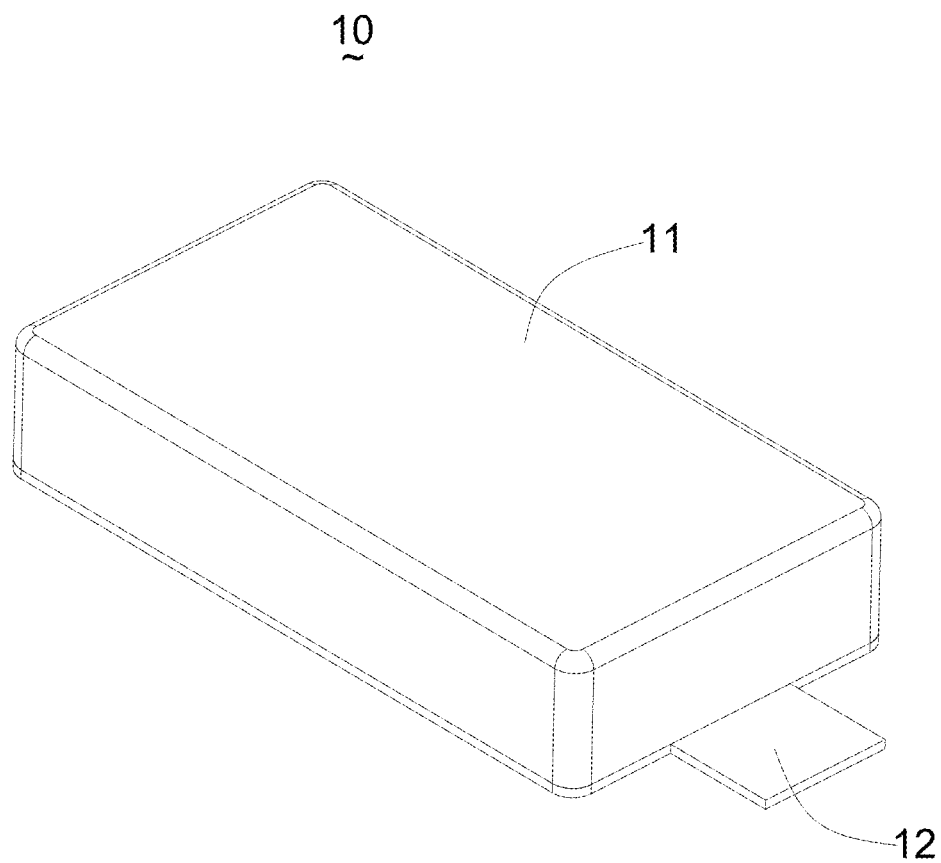
FIG. 1 is an isometric view of a vibration motor in accordance with a first exemplary embodiment of the present disclosure.
Figure 2:
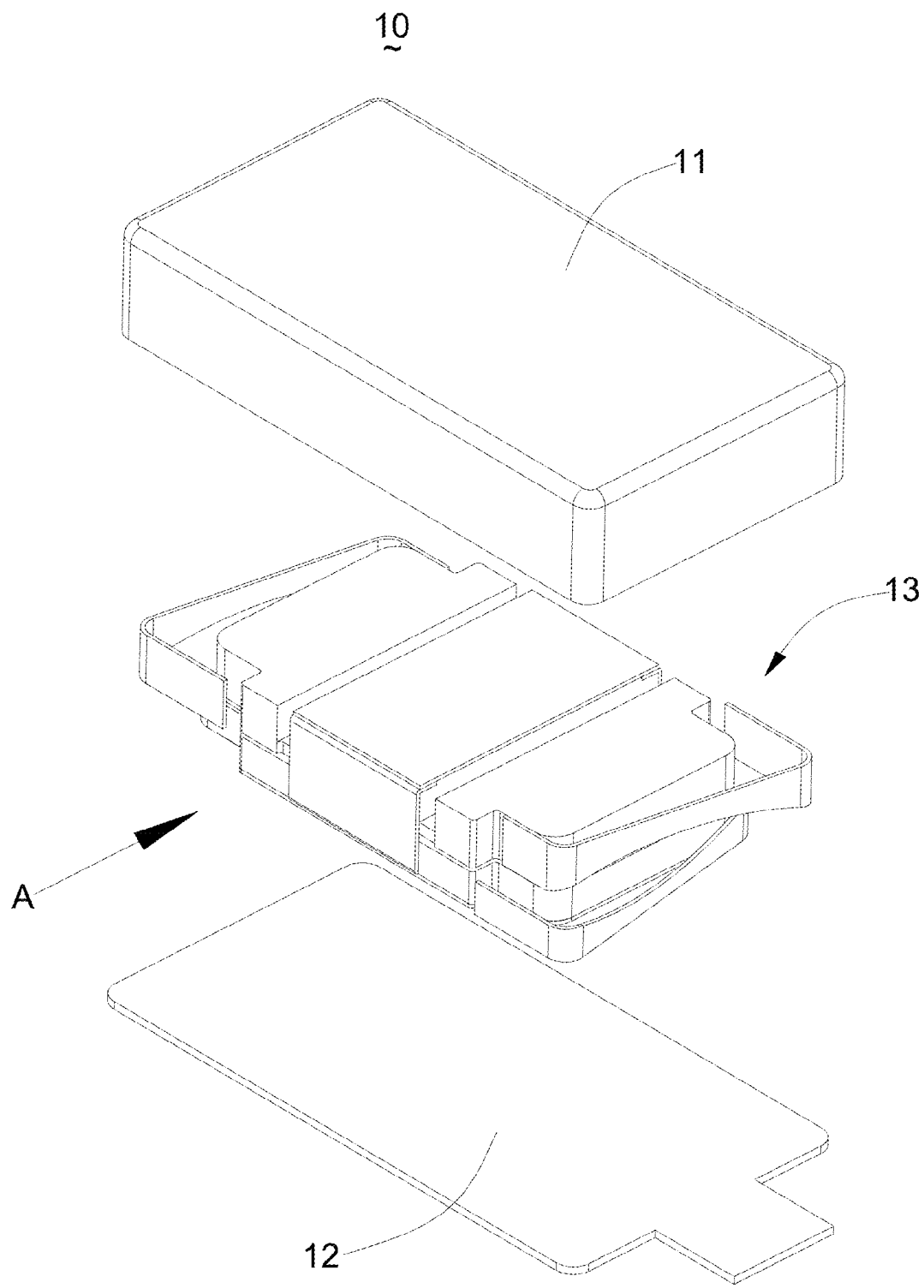
FIG. 2 is an exploded view of the vibration motor in FIG. 1.
Figure 3:
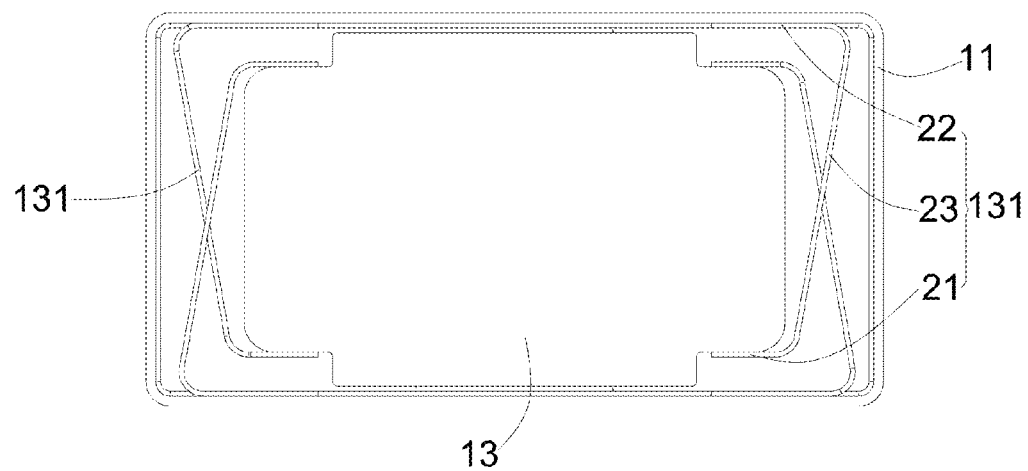
FIG. 3 is a bottom view of the vibration motor in FIG. 1, a substrate thereof being removed.

Referring to FIGS. 1-3, a vibration motor 10 in accordance with a first exemplary embodiment of the present disclosure includes a cover 11, a substrate 12, a housing formed cooperatively by the cover 11 and the substrate 12, and a vibration unit 13 suspended in the housing. The vibration unit 13 includes a plurality of elastic members 131 for suspending the vibration unit 13 in the housing and the elastic members are fixed to sidewalls of the housing.

Figure 4:
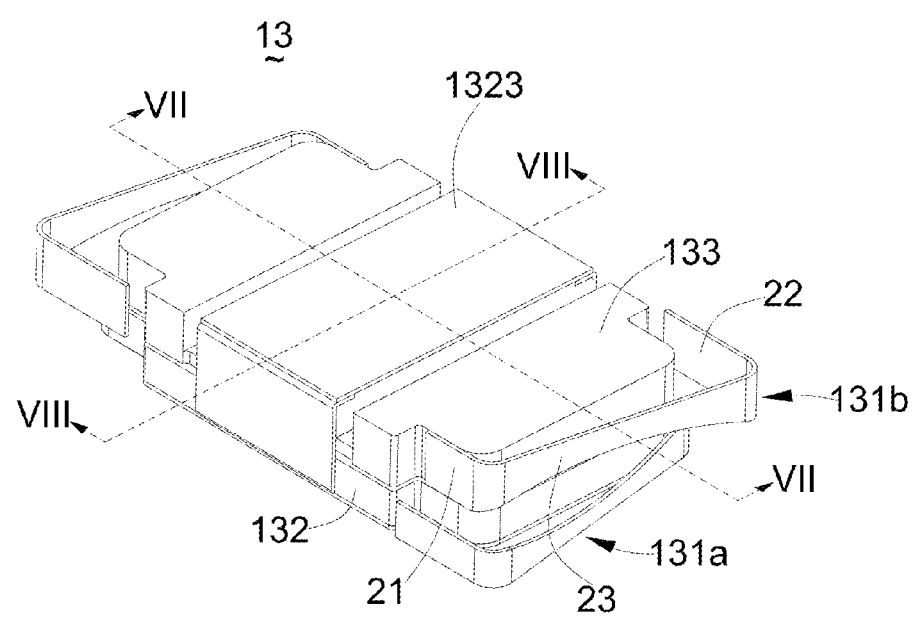
FIG. 4 is an isometric view of a vibration unit of the vibration motor in FIG. 1.

Referring to FIG. 4, the vibration unit 13 further includes a first vibrator 132, and a second vibrator 133 separated from the first vibrator 132. The elastic members 131 includes a pair of first elastic members 131a each having one end fixed to the first vibrator 132 and a pair of second elastic member 131b each having one end fixed to the second vibrator 133. Referring to FIG. 3 again, each of the elastic members includes a first fixing part 21 connecting with the corresponding vibrator, a second fixing part 22 connecting with the housing, and an elastic arm 23 connecting the first fixing part 21 to the second fixing part 22.

Figure 5:
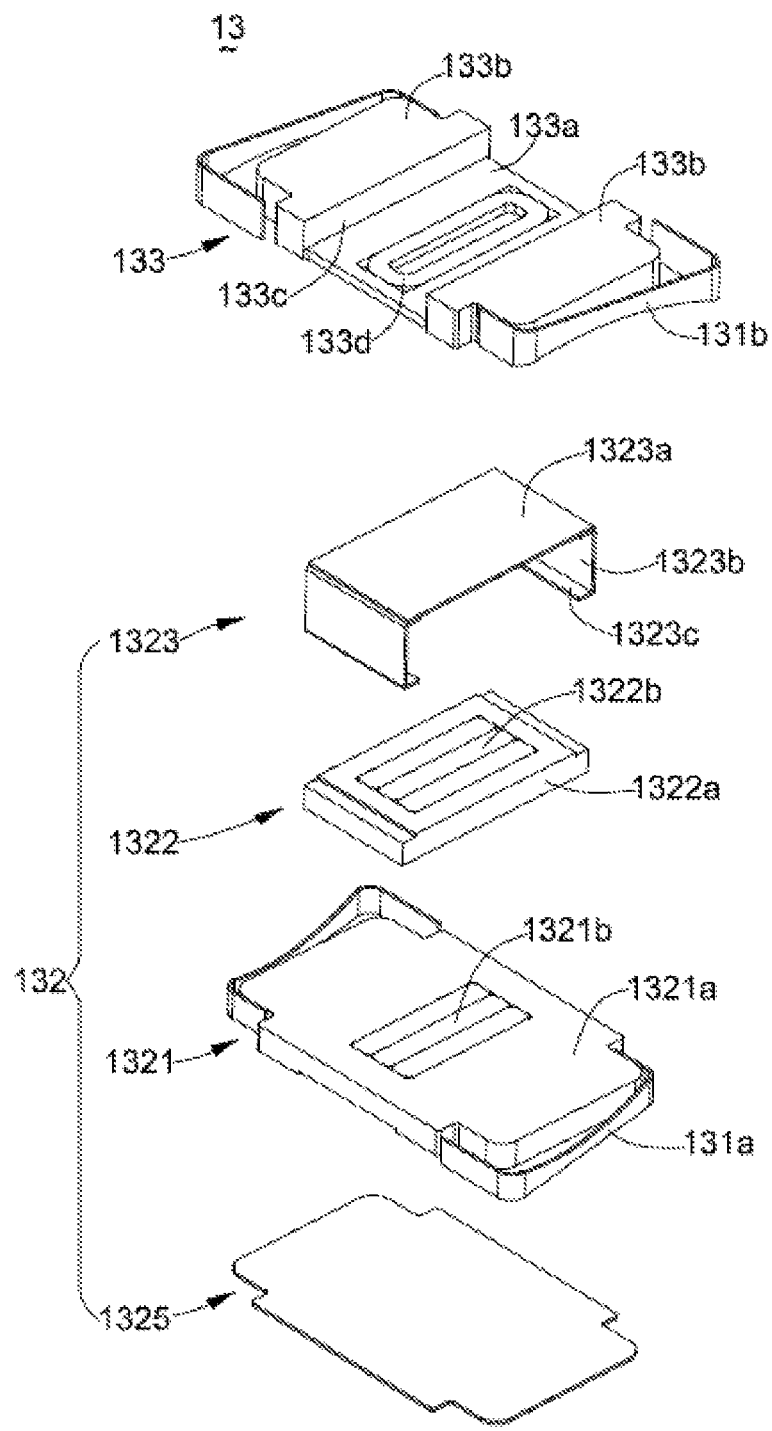
FIG. 5 is an exploded view of the vibration unit in FIG. 4.

Referring to FIG. 5, an exploded view of the vibrator unit 13, the first vibrator 132 and the second vibrator 133 cooperatively form the vibration unit 13. The first vibrator 132 is separated from the second vibrator 133, and each of the vibrators is suspended in the housing by the elastic members. The first vibrator 132 includes a main part 1321, an auxiliary part 1322 opposed to the main part 1321, a connecting member 1323 for combining the main part 1321 and the auxiliary part 1322, a pole plate 1325 for carrying the main part 1321. The main part 1321 further includes a first weight 1321a and a main magnet 1321b assembled with the first weight 1321a. The auxiliary part 1322 further comprises a first support plate 1322a and an auxiliary magnet 1322b assembled with the first support plate 1322a. The connecting member 1323 is used to combine or assemble the main part 1321 with the auxiliary part 1322 for fixing the auxiliary part 1322 relative to the main part 1321. For achieving the purpose mentioned above, the connecting member 1323 is configured to have a top plate 1323a, a side plate 1323b, and a bottom plate 1323c connected to the top plate 1323a by the side plate 1323b. The first elastic members 131a is connected to the main part 1321 of the first vibrator 132, so that the first vibrator, i.e., the combination of the main part 1321, the auxiliary part 1322, the connecting member 1323 and the pole plate 1325, is suspended by the first elastic members 131a.

The second vibrator 133 includes a second support plate 133a, a second weight 133b connected with the second support plate 133a, and a coil 133d fixed and positioned by the second support plate 133a. In this embodiment, the second vibrator 133 has two second weights 133b located at two sides of the second support plate 133a. A thickness of the second weight 133b is greater than a thickness of the second support plate 133a, and accordingly a voidance 133c is formed cooperatively by the second support plate 133a and the second weights 133b. The second support plate 133a and the second weights 133b may be an integrated piece and made of the same material. In fact, the second weight 133b may also be a separated component from the second support plate 133a and assembled with the second support plate 133a. The second elastic members 131b are connected to the second weights 133b for suspending the second vibrator 133 in the housing.

Figure 6:
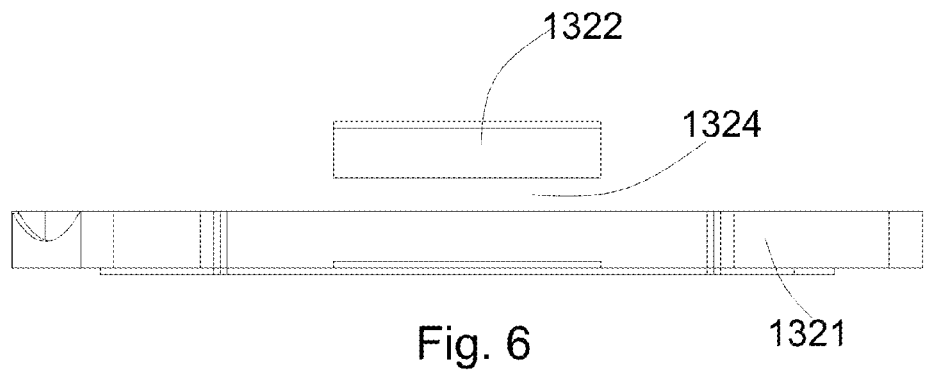
FIG. 6 is a side view of a first vibrator of the vibration unit along a direction A in FIG. 2, wherein a connecting member thereof has been removed.
Figure 7:
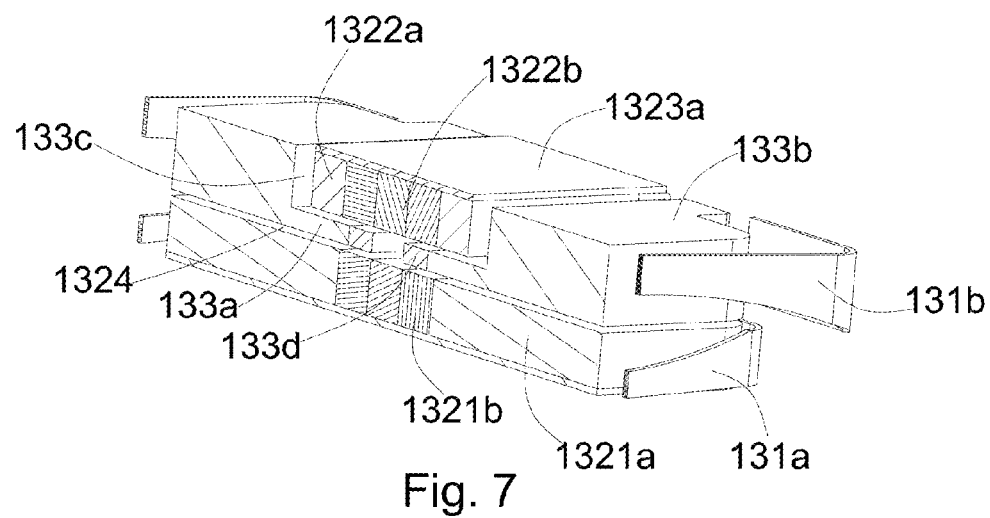
FIG. 7 is a cross-sectional view of the vibration unit taken along line VII-VII in FIG. 4.
Figure 8:
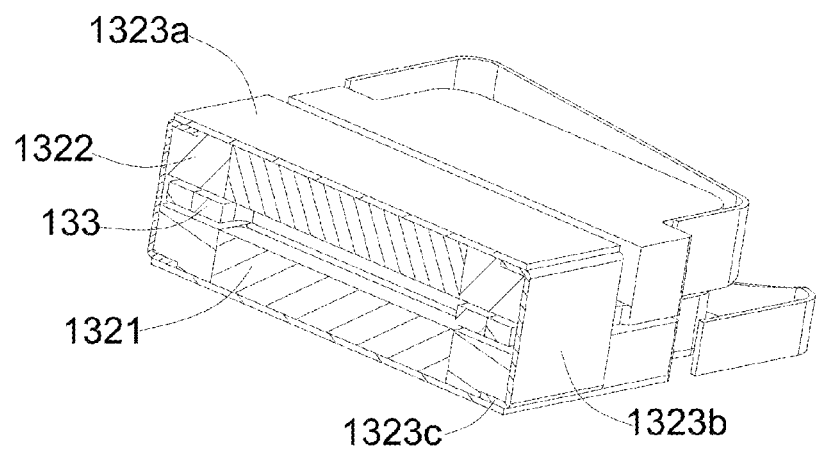
FIG. 8 is a cross-sectional view of the vibration unit taken along line VIII-VIII.

Referring to FIGS. 6-7, while assembled, the auxiliary part 1322 keeps a distance from the main part 1321 and a gap 1324 is accordingly formed between the auxiliary part 1322 and the main part 1321. The combination of the first support plate 1322a and the auxiliary magnet 1322b, i.e., the auxiliary part 1322, is fixed on the top plate 1323*a* of the connecting member 1323 and is at least partially received in the voidance 133*c*. The second support plate 133*a* is located in the gap 1324 formed between the auxiliary part 1322 and the main part 1321, and has no contact with any of the main part 1321 and the auxiliary part 1322. The second vibrator 133 is suspended in the housing by the connection between the second elastic members 131*b* and the second weights 133*b*. The first vibrator 132 is suspended in the housing by the connection between the first elastic members and the first weights 1321*a*. The coil 133*d* is located right between the auxiliary magnet 1322*b* and the main magnet 1321*b*. When electrified, Ampere Force is accordingly generated. Referring to FIG. 8, which clearly illustrate how the auxiliary part 1322 is assembled with the main part 1321, the auxiliary part 1322 is attached to the top plate 1323*a* of the connecting member, and the main part is attached to the bottom plate 1323*c* of the connecting member. A height of the side plate 1323*b* is greater than a total height of the auxiliary part 1322 and the main part 1321, by which the gap 1324 (see FIG. 6) is formed. The second support plate 133*a* is located in the gap 1324.

Referring FIGS. 1-8, by virtue of the configuration described above, the first vibrator 132, i.e., the combination of the main part 1321, the auxiliary part 1322, the connecting member 1323 and the pole plate, is capable of moving along the deformation direction of the first elastic members 131*a* with the auxiliary part 1322 moving through the voidance 133*c*, and the second vibrator 133, i.e., the combination of the second support plate 133*a*, and the second weights 133*b*, is capable of moving along the deformation direction of the second elastic members 131*b* with the second support plate moving through the gap 1324.

The first vibrator 132 is configured to have a resonant frequency that is different from a resonant frequency of the second vibrator 133. When the coil receives a driving signal, one of the first and second vibrators which has a resonant frequency substantially close to the frequency of the driving signal will vibrate, and the other will not vibrate, or the other will only vibrate slightly. Because the vibration unit 13 has two vibrators having different resonant frequencies, the coil 133*d* could receive driving signals comprising two frequencies close to or substantially same to the resonant frequencies of the two vibrators, by which the first or the second vibrator could vibrate with the maximum amplitude. Another word, the vibration motor is capable of working at two resonant frequencies for satisfying the desires of the users.

Figure 9:
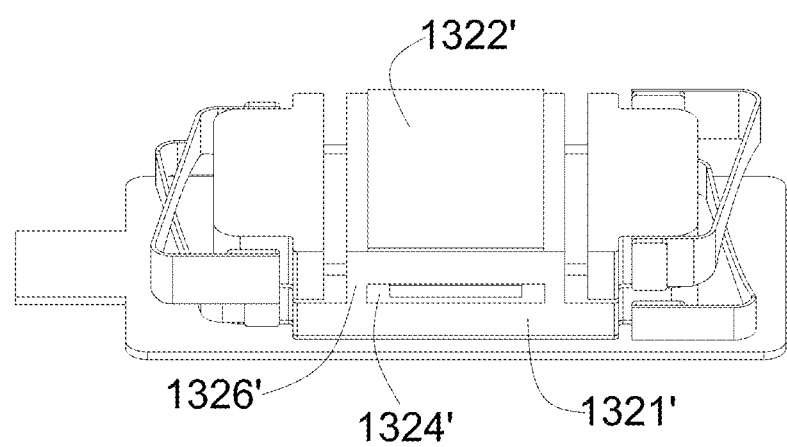
FIG. 9 is an isometric of a vibration unit of a vibration motor in accordance with a second exemplary embodiment of the present disclosure.

Referring to FIG. 9, a vibration motor in accordance with a second exemplary embodiment of the present disclosure is disclosed. The second embodiment is similar to the first embodiment, and the difference is that the connecting member in the first embodiment is replaced by the integrated one-piece structure of the auxiliary part and the main part. The auxiliary part 1322' includes an extending wall 1326' extending to the main part 1321'. A height of the extending wall determines the gap 1324'.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A vibration motor, comprising:
   a housing;
   a vibration unit accommodated and suspended in the housing, the vibration unit including a first vibrator having a first resonant frequency, and a second vibrator having a second resonant frequency;
   a first elastic member having one end fixed to the first vibrator and another end fixed to the housing for suspending the first vibrator in the housing;
   a second elastic member having one end fixed to the second vibrator and another end fixed to the housing for suspending the second vibrator in the housing, wherein, the first vibrator includes a gap for receiving a portion of the second vibrator, and the second vibrator includes a voidance for receiving a portion of the first vibrator.

2. The vibration motor as described in claim 1, wherein the first vibrator includes a main part and an auxiliary part keeping a distance from the main part for forming the gap.

3. The vibration motor as described in claim 2, wherein the first vibrator further includes a connecting member comprising a top plate attached to the auxiliary part, a bottom plate for carrying the main part, and a side plate connecting the top plate to the bottom plate.

4. The vibration motor as described in claim 2, wherein the main part includes a first weight and a main magnet positioned by the first weight, and the auxiliary part includes a first support plate and an auxiliary magnet positioned by the first support.

5. The vibration motor as described in claim 4, wherein the second vibrator comprises a second support plate at least partially received in the gap, a pair of second weights located at two sides of the second support plate, a thickness of the second weight is greater than a thickness of the second support plate for forming the voidance for receiving the auxiliary part.

6. The vibration motor as described in claim 5 further including a coil positioned by the second support plate and located between the main magnet and the auxiliary magnet.

\* \* \* \* \*